United States Patent [19]

Hosono

[11] 4,271,375

[45] * Jun. 2, 1981

[54] FLASH LIGHT DISCHARGE DEVICE

[75] Inventor: Tsutomu Hosono, Tokyo, Japan

[73] Assignee: Fuji Photo Optical Co., Ltd., Omiya, Japan

[*] Notice: The portion of the term of this patent subsequent to Jul. 31, 1996, has been disclaimed.

[21] Appl. No.: 53,772

[22] Filed: Jul. 2, 1979

Related U.S. Application Data

[63] Continuation of Ser. No. 788,606, Apr. 18, 1977, Pat. No. 4,163,178.

[30] Foreign Application Priority Data

Apr. 16, 1976 [JP] Japan .................................. 51-43316
May 15, 1976 [JP] Japan .................................. 51-61502

[51] Int. Cl.³ ........................................... H05B 41/32
[52] U.S. Cl. .................................. 315/241 P; 315/135
[58] Field of Search .................... 315/151, 241 P, 135, 315/133; 354/127, 145; 320/1

[56] References Cited

U.S. PATENT DOCUMENTS

| | | | |
|---|---|---|---|
| 3,526,821 | 9/1970 | Thomas | 315/241 R |
| 3,764,849 | 10/1973 | Ohta | 315/241 P |
| 3,890,538 | 6/1975 | Iwata et al. | 315/241 P |
| 3,898,514 | 8/1975 | Takahashi | 315/136 |
| 4,068,150 | 1/1978 | Iwata et al. | 354/127 X |
| 4,163,178 | 7/1979 | Hosono | 315/241 P |

Primary Examiner—Eugene La Roche
Attorney, Agent, or Firm—Pasquale A. Razzano; Harold L. Stults

[57] ABSTRACT

In a flash light discharge device including a strobo tube attached to a camera body, both the positive and negative outputs of a blocking oscillator are made use of. One output is used for charging a main capacitor for making the strobo tube discharged, and the other output is used for energizing an indicator or indicators. Both the outputs may be used for charging the main capacitor to accelerate the charging of the capacitor. The indicator energized by the output of the blocking oscillator while the main capacitor is charged may be an indicator which indicates by intermittent lighting that the main capacitor is being charged.

1 Claim, 6 Drawing Figures

FLASH LIGHT DISCHARGE DEVICE

This is a continuation, of application Ser. No. 788,606, filed Apr. 18, 1977, now U.S. Pat. No. 4,163,178, issued July 31, 1979.

BACKGROUND OF THE INVENTION

1. Field of the Invention

This invention relates to a flash light discharge device including a flash light discharge tube attached to a camera body, and more particularly to a flash light discharge device provided with warning indicators.

2. Description of the Prior Art

In a flash light discharge device (hereinafter referred to as "strobo device") including a flash light discharge tube (hereinafter referred to as "strobo"), a main capacitor is employed to energize the strobo. The strobo device has a power source to charge the main capacitor. Since the level of the voltage of the power source is comparatively low (several to ten and several volts), it takes a long time to charge the main capacitor. When it is desired to take pictures successively with flash light, the time for charging the main capacitor is preferred to be as short as possible. Therefore, in order to shorten the charging time, it has been practiced to use a blocking oscillator in the strobo device.

Since the output of the oscillator is of A.C. current, a rectifier is used to charge the main capacitor and either the positive or the negative output of the oscillator is used to charge the capacitor. This means that only a half of the charging time is contributed to the charging of the capacitor in effect, and the remaining half is wasted.

The conventional strobo device further has a defect in that the output of oscillator is almost consumed to charge the main capacitor when the charging of the capacitor has started and accordingly an indicator lamp connected with the strobo device to indicate the charging of the capacitor would not light immediately after the start of charging.

SUMMARY OF THE INVENTION

The primary object of the present invention is to provide a strobo device in which the output of the oscillator therein for charging the main capacitor is made best use of.

A more specific object of the present invention is to provide a strobo device in which the output of the oscillator therein is used for energizing an electrically operated device even when the output is not used for charging the capacitor.

Another object of the present invention is to provide a strobo device in which not only the positive but also the negative output of the A.C. current output of the oscillator is used for charging the main capacitor.

A further object of the present invention is to provide a strobo device provided with an indicator which indicates that the main capacitor is being charged wherein the indicator is lit even immediately after the start of charging.

A still another object of the present invention is to provide a strobo device provided with a first indicator which indicates that the charging circuit closed and a second indicator which indicates that the charging is completed.

The above objects are accomplished by providing a plurality of output terminals on the oscillator from which rectified outputs are taken out respectively. For instance, from one output terminal of the oscillator a positive rectified output is taken out, and from another output terminal is taken out a negative output. While one output is used for charging the main capacitor, another output may be used for energizing an indicator. Further, it is possible to use both the outputs for charging the main capacitor. When one output is used for energizing an indicator which indicates for instance that the main capacitor is being charged while the other output is used for charging the capacitor, the indicator can be lit even immediately after the start of charging of the capacitor.

DESCRIPTION OF THE PREFERRED EMBODIMENTS

Figure 1:
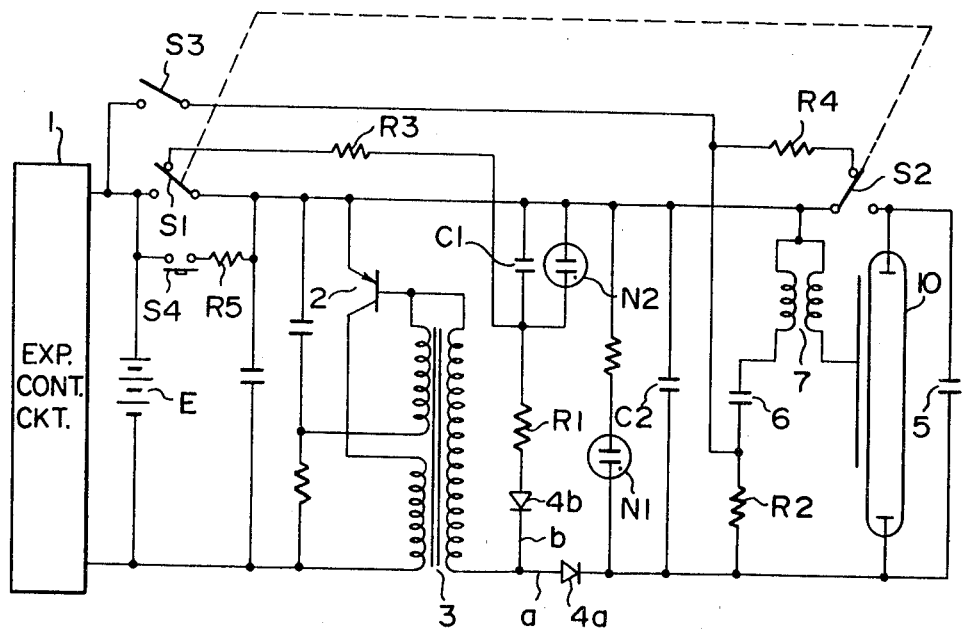
FIG. 1 is a circuit view showing an embodiment of an electric circuit employed in the strobo device in accordance with the present invention.

Referring to FIG. 1 which shows an example of an electric circuit for driving a strobo device in accordance with the present invention, a single power source E is commonly used for energizing an exposure control circuit 1 and a strobo discharging circuit including a blocking oscillator 3 and a main capacitor 5. A power switch S1 is connected between the power source E and a transistor 2 of the oscillator 3. The power switch S1 is opened in the state shown in FIG. 1. When the power switch S1 is closed (separated from a contact connected with a resistor R3), a relay switch S2 is changed over in response thereto to connect the power source E to the main capacitor 5 by way of the blocking oscillator 3. In this case, the blocking oscillator 3 is connected with the main capacitor 5 by way of a first output terminal a and a first diode 4a. Thus, the output of the blocking oscillator 3 is half-wave rectified and for instance the positive output is used for charging the main capacitor 5. Then, when the terminal voltage of the main capacitor 5 has reached a level high enough to discharge the strobo tube 10, a neon tube N1 is lit to indicate that the flash light photographing has become possible. A synchronizing trigger switch S3 is connected between the exposure control circuit 1 and a trigger capacitor 6 which is connected with a trigger coil 7 to excite the trigger coil 7 and make the strobo tube 10 be discharged when it is closed. A charging resistor R2 is connected with the trigger capacitor 6.

The blocking oscillator 3 has a second output terminal b connected with a second diode 4b which takes out a negative output of the oscillator 3. The second diode 4b is connected with a parallel circuit of a capacitor C1 and a neon tube N2 by way of a charging resistor R1. When the terminal voltage of the capacitor C1 has reached a predetermined level, the neon tube N2 is lit, and the capacitor C1 is discharged by a voltage corresponding to the hysteresis voltage of the neon tube N2. Simultaneously, the capacitor C1 is charged by the output of the blocking oscillator 3 by way of the second output terminal b thereof and the resistor R1. Therefore, as a result, the neon tube N2 is intermittently lit to indicate that the power switch S1 is turned on to charge the main capacitor 5.

When the power switch S1 is returned to its original position as shown in FIG. 1 to stop the charging of the main capacitor 5, the relay switch S2 is similarly changed over to its original position and the neon tube energizing capacitor C1 and the trigger capacitor 6 are short-circuited by way of the resistors R3 and R4, and accordingly the malfunction caused by the residual charge remaining in the capacitor C1 and the trigger capacitor 6 is prevented.

The circuit is further provided with a battery check switch S4 to know if the level of the source voltage of the power source E is above a predetermined level while the power switch S1 is in the off position as shown in FIG. 1. The predetermined level can be controlled by an adjusting resistor R5. A neon tube N1 is connected in parallel with a capacitor C2 so that the neon tube N1 is lit when the capacitor C2 is charged up to a predetermined level determined by the adjusting resistor R5 and the battery check switch S4 is closed if the level of the source voltage is above the predetermined value. In order that the neon tube N2 may not be lit even when the battery check switch S4 is turned on, the capacitor C1 is short-circuited by way of a resistor R3. In summary, in the above described embodiment as shown in FIG. 1, the output of the blocking oscillator 3 is used both for charging the main capacitor 5 and for energizing the indicator tube N2. The main capacitor 5 is used for making the strobo tube 10 discharged, and the indicator tube N2 is used for indicating that the main capacitor 5 is being charged. Further, when the main capacitor 5 is charged up, a neon tube N1 is lit to indicate the completion of the charging. The charge-up indicating tube N1 is further used as a battery check tube when the power is not connected with the main capacitor 5. The tube N1 is lit upon operation of a battery check switch when the voltage of the power source is above a predetermined level.

Figure 2:
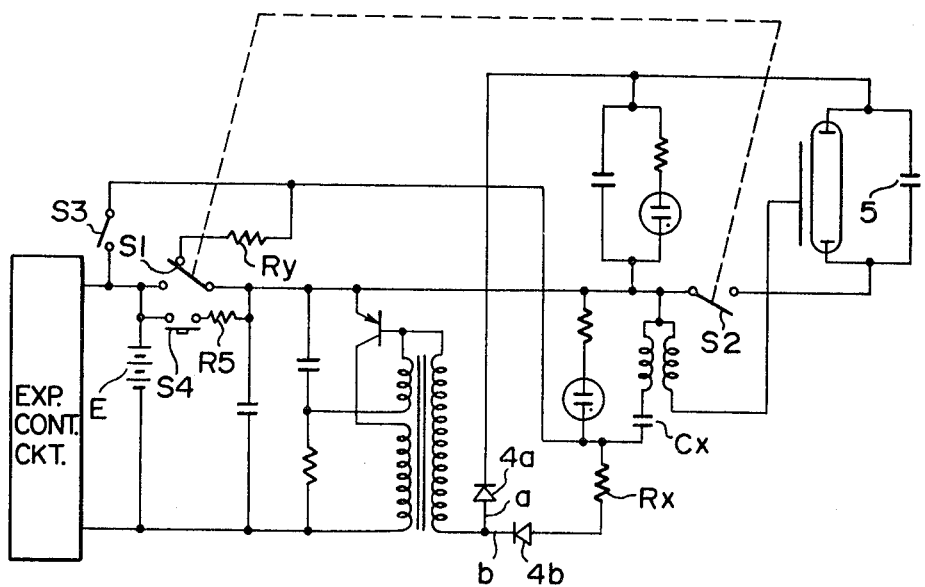
FIG. 2 is a circuit view showing another embodiment of an electric circuit employed in the strobo device in accordance with the present invention.

A second embodiment of the present invention will be described with reference to FIG. 2. In the circuit shown in FIG. 2, a single capacitor Cx is substituted for said capacitor C1 and the trigger capacitor 6, a single resistor Rx is substituted for the two charging resistors R1 and R2, and a single resistor Ry is substituted for the two discharging resistors R3 and R4 in the first embodiment shown in FIG. 1 to save the number of capacitors and resistors to simplify the structure of the circuit. The elements in the second embodiment equivalent to those shown in FIG. 1 are designated by the same reference numerals.

In accordance with the above described embodiments of the present invention, indicators are provided in a strobo device and are energized simultaneously with the energization of the strobo device by utilizing the negative output of a blocking oscillator while the positive output thereof is used to charge the main capacitor in the strobo device.

Figure 3:
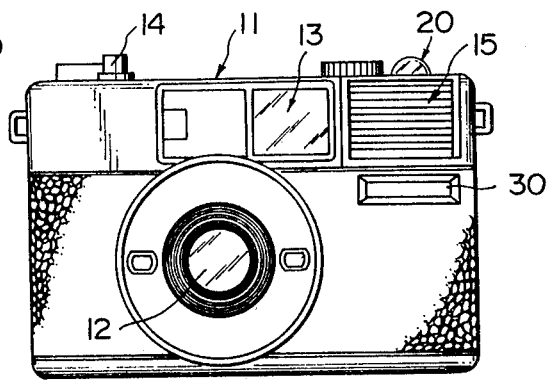
FIG. 3 is a front view of a photographic camera in which the strobo device in accordance with the present invention is incorporated.

In the strobo device provided with indicators of different kinds as described hereinabove, it is desired that the different kinds of indicators be distinguished from each other. On the other hand, in order to save the space on the camera body, it is desired that the indicators be combined into one lamp. One lamp can be used to indicate different kinds of states by changing its mode of lighting. One example of a camera body provided with an indicator lamp as well as a strobo tube is illustrated in FIG. 3. Referring to FIG. 3, a camera body 11 has on its front face a taking lens 12, a view-finder window 13 and a strobo tube 15. The camera body 11 is provided on the top face thereof with a shutter release button 14. The camera body 11 is further provided with an indicator 20 on the top face thereof. A power switch 30 corresponding to said switch S1 in FIG. 1 is provided on the front face of the camera body 11.

Figure 4:
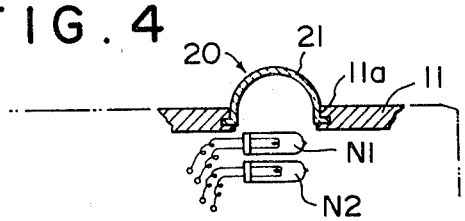
FIG. 4 is a sectional view showing an example of indicators employed in the strobo device in accordance with the present invention.

The internal structure of the indicator 20 is shown in detail in FIG. 4. A semi-cylindrical glass 21 is fixed to an opening 11a provided in the top face of the camera body 11 and two neon tubes N1 and N2 are disposed under the glass 21. The glass 21 may be of light diffusion type, or may be replaced with a light diffusing plastic plate. In order to indicate the different kinds of states with the two neon tubes N1 and N2, the color of the light indicated by the two neon tubes is made different from each other. For instance, the first neon tube N1 used for indicating that the main capacitor is charged up is made of a neon tube which has a phosphor coating layer on the internal face of the tube that emits green light when the tube is discharged so that green light may be observed through the indicator 20. The second neon tube N2 used for indicating that the main capacitor is being charged or the source voltage is above a predetermined level is made of a neon tube which has a transparent glass tube and emits orange light when excited. Thus, the two kinds of indication are distinguished from each other by the color of the light observed at the indicator 20.

In operation of the indicator 20 constructed as described above, the second neon tube N2 is intermittently lit to indicate that the power switch S1 is closed and the main capacitor is being charged when the main switch is closed. The intermittent indication is made in orange in color. When the main capacitor is charged up and the camera becomes ready for a flash light photographing, the first neon tube N1 is turned on to emit green light in the indicator 20. When the green light is emitted by the first neon tube N1, the orange light emitted by the second neon tube N2 is also viewed through the indicator 20. However, since the green light is clearly observed in the indicator 20, the photographer can easily recognize that the main capacitor has been fully charged up.

Figure 5A:
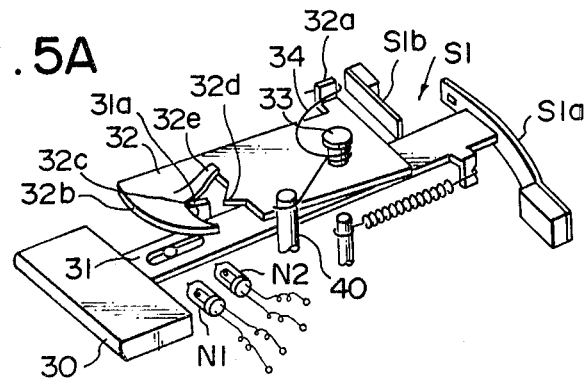
FIGS. 5A and 5B are fragmentary perspective views showing an example of a structure of a mechanism for operating a power switch in the strobo device in accordance with the present invention.
Figure 5B:
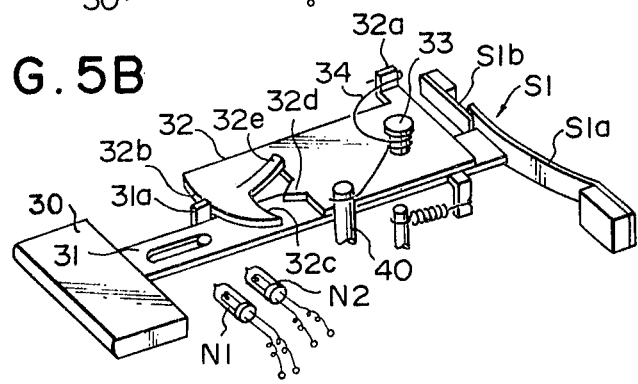

The detailed internal mechanical structure of the power switch 30 will hereinbelow be described referring to FIGS. 5A and 5B. The power switch structure has a manually operable switch button indicated at 30 exposed on the front face of the camera body 11. The switch button 30 is movable between a depressed position as shown in FIG. 5A and a projected position as shown in FIG. 5B. The switch button 30 is fixed to the front end of a slide lever 31 which is slidably provided in the camera body 11. The slidable lever 31 is engageable with a cam lever 32. When the slidable lever 31 is engaged with the cam lever 32, the button 30 is in its depressed position, and when the slidable lever 31 is disengaged from the cam lever 32, the button 30 is in its projected position. The cam lever 32 is pivotally mounted on a pivot 33 and is further movable in such a direction that the front end thereof is separated from the slidable lever 31. The front end of the cam lever 32 is separated in FIG. 5A and is in contact with the slidable lever 31 in FIG. 5B. The cam lever 32 is provided with an upwardly bent portion 32a and an end of a spring 34 is engaged with the upwardly bent portion 32a. The spring 34 has a coil portion wound around the pivot 33 and the other end of the spring 34 is engaged with a stopper pin 40 to urge the cam lever 32 in the counterclockwise direction and further to urge the cam lever 32 to be in contact with the slidable lever 31. The cam lever 32 is provided with a cam face 32b along which an engaging projection 31a formed on the slidable lever 31 slides. The cam lever 32 is further provided with a cut-away portion 32c which is engageable with the engaging projection 31a. The cut-away portion 32c of the cam lever 32 is provided with an engaging extension 32d and a tapered rising portion 32e. The switch S1 comprises a fixed contact S1b and a movable contact S1a which is separated from the fixed contact S1b when the slidable lever 31 is moved to the right in FIGS. 5A and 5B upon depression of the switch button 30. The movable contact S1a is urged to be in contact with the fixed contact S1b and is brought into contact the the fixed contact S1b when the switch button 30 is in the projected position as shown in FIG. 5B.

In operation of the switch as described hereinabove, the switch button 30 is in the depressed position and the switch S1 is opened in the state shown in FIG. 5A. Then, when the switch button 30 is depressed and released, the engaging projection 31a of the slide lever 31 slips in under the tapered rising portion 32e of the cam lever 32 as the cam lever 32 swings counterclockwise and then the engaging projection 31a slides on the back face of the cam lever 32 to the left until the engaging projection 31a appears at the cam face 32b of the cam lever 32 as shown in FIG. 5B. While the engaging projection 31a slides on the back face of the cam lever 32, the front end of the cam lever 32 is separated from the slide lever 31. Then, when the switch button 30 is again depressed, the engaging portion 31 of the slide lever 31 slides along the cam face 32b of the cam lever 32 to effect the clockwise swing of the cam lever 32 until the engaging portion 31a slips into the cut-away portion 32c of the cam lever 32. When the engaging portion 31a slips into the cut-away portion 32c, the mechanism returns to its original position as shown in FIG. 5A.

I claim:
1. A flash discharge device comprising:
   a blocking oscillator;
   a first rectifier connected to said blocking oscillator to receive output signals therefrom and polarized to rectify output signals in one polarity;
   a strobe circuit connected to said first rectifier and comprising a strobe tube and a main capacitor connected thereto to store electric charge supplied through said first rectifier to operate said strobe tube;
   a second rectifier connected to the output of said blocking oscillator to receive output signals therefrom and polarized oppositely from said first rectifier to rectify in the opposite polarity said blocking oscillator output signals applied to said second rectifier; and
   voltage indicating means for indicating that said main capacitor is being charged connected to said second rectifier to be energized by the oppositely polarized rectified signals therefrom.

* * * * *